(12) United States Patent
Ishihara et al.

(10) Patent No.: US 12,387,460 B2
(45) Date of Patent: Aug. 12, 2025

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventors: Takahiro Ishihara, Machida (JP); Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 17/877,229

(22) Filed: Jul. 29, 2022

(65) Prior Publication Data

US 2023/0037801 A1 Feb. 9, 2023

(30) Foreign Application Priority Data

Aug. 3, 2021 (JP) ................... 2021-127254

(51) Int. Cl.
*G06V 10/74* (2022.01)
*G06F 3/14* (2006.01)
*G06F 8/65* (2018.01)
*G06V 20/59* (2022.01)

(52) U.S. Cl.
CPC .......... *G06V 10/761* (2022.01); *G06F 3/1462* (2013.01); *G06F 8/65* (2013.01); *G06V 20/59* (2022.01)

(58) Field of Classification Search
CPC ...... G06V 10/761; G06V 20/59; G06V 20/58; G06F 3/1462; G06F 8/65; G06F 3/147; G06F 11/30; G09G 2330/12; G09G 2380/10
See application file for complete search history.

(56) References Cited

U.S. PATENT DOCUMENTS

| 8,516,393 B2 * | 8/2013 | Davis .................. G06F 3/1423 |
| | | 361/679.04 |
| 2015/0082280 A1 * | 3/2015 | Betak .................. G06F 11/3688 |
| | | 717/124 |
| 2019/0187976 A1 * | 6/2019 | Lee .......................... H04W 4/44 |
| 2021/0191714 A1 * | 6/2021 | Ullman .................. B60K 37/00 |

FOREIGN PATENT DOCUMENTS

| JP | 2018-132979 A | 8/2018 |
| WO | 2019/179778 A1 | 10/2018 |

* cited by examiner

*Primary Examiner* — Wassim Mahrouka
(74) *Attorney, Agent, or Firm* — Sughrue Mion, PLLC (57) ABSTRACT

An information processing apparatus obtains first image data representing an image displayed on a first monitor provided in an autonomous vehicle after the completion of updating of first software that controls the display on the first monitor. Then, the information processing apparatus determines whether or not the items displayed on a second monitor used for remotely monitoring the operation of the autonomous vehicle after the completion of updating of second software that controls the display on the second monitor and the items displayed on the first monitor extracted from the first image data are identical to each other.

18 Claims, 7 Drawing Sheets

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2021-127254, filed on Aug. 3, 2021, which is hereby incorporated by reference herein in its entirety.

BACKGROUND

Technical Field

The present disclosure relates to a technology used to remotely monitor the operation of an autonomous vehicle.

Description of the Related Art

Patent Literature 1 in the citation list below discloses a system configured to update software of devices provided in vehicles by OTA (Over The Air). The system disclosed in Patent Literature 1 includes a server that distributes updating software to vehicles according to the priority of updating of software.

CITATION LIST

Patent Literature

Patent Literature 1: Japanese Patent Application Laid-Open No. 2018-132979

SUMMARY

An object of this disclosure is to provide a technology that enables to determine whether or not the items displayed on a monitor provided in an autonomous vehicle and the items displayed on a monitor used for remotely monitoring the operation of the autonomous vehicle are identical to each other.

According to one aspect of the technology disclosed herein, there is provided an information processing apparatus. The information processing apparatus may comprise a controller including at least one processor configured to execute the processing of:
  obtaining first image data representing an image displayed on a first monitor provided in an autonomous vehicle after the completion of updating of first software that controls the display on the first monitor; and
  determining whether or not the items displayed on a second monitor used for remotely monitoring the operation of the autonomous vehicle after the completion of updating of second software that controls the display on the second monitor and the items displayed on the first monitor extracted from the first image data are identical to each other.

According a second aspect of the technology disclosed herein, there is provided an information processing method. The information processing method may comprise:
  obtaining first image data representing an image displayed on a first monitor provided in an autonomous vehicle after the completion of updating of first software that controls the display on the first monitor; and
  determining whether or not the items displayed on a second monitor used for remotely monitoring the operation of the autonomous vehicle after the completion of updating of second software that controls the display on the second monitor and the items displayed on the first monitor extracted from the first image data are identical to each other.

According to a third aspect of the technology disclosed herein, there is provided a system. The system may comprise:
  an on-vehicle apparatus configured to send first image data representing an image displayed on a first monitor provided in an autonomous vehicle after the completion of updating of first software that controls the display on the first monitor; and
  an information processing apparatus provided with a controller including at least one processor, the controller being configured to execute the processing of determining whether or not the items displayed on a second monitor used for remotely monitoring the operation of the autonomous vehicle after the completion of updating of second software that controls the display on the second monitor and the items displayed on the first monitor extracted from the first image data received from the on-vehicle apparatus are identical to each other.

According to this disclosure, it is possible to determine whether or not the items displayed on a monitor provided in an autonomous vehicle and the items displayed on a monitor used for remotely monitoring the operation of the autonomous vehicle are identical to each other.

DESCRIPTION OF THE EMBODIMENTS

An autonomous vehicle is provided with a monitor (first monitor) that displays the state of the vehicle. In cases where the operation of the autonomous vehicle is monitored remotely, the state of the vehicle is displayed also on a monitor (second monitor) provided outside the vehicle. In order to enable remote recognition of the state of the autonomous vehicle that can be recognized from the items displayed on the first monitor, it is required to make the items displayed on the first monitor and the items displayed on the second monitor identical to each other.

If the software (first software) that controls the display on the first monitor is updated, the items displayed on the first monitor may change in some cases. Therefore, in order to keep the identity of the items displayed on the first monitor and the items displayed on the second monitor, it is necessary to update the software (second software) that controls the display on the second monitor in accordance with the update of the first software.

The information processing apparatus according to this disclosure has a controller. The controller may obtain first image data representing an image displayed on the first monitor after the completion of update of the first software. The first image data is image data representing an image (or screen) displayed on the first monitor by (or under the control of) the first software after the update. Therefore, the first image data reflects the items displayed on the first monitor controlled by the first software after the update.

Moreover, the controller may extract the items displayed on the first monitor from the first image data obtained as above. Then, the controller may determine whether or not the items displayed on the second monitor after update of the second software and the items displayed on the first monitor extracted from the first data are identical to each other.

As above, it is possible to determine whether or not the items displayed on the first monitor controlled by the first software after the update and the items displayed on the second monitor controlled by the second software after the update are identical to each other. In other words, in the case where the items displayed on the first monitor has changed due to the update of the first software, it is possible to determine whether or not the items displayed on the second monitor has also changed in conformity with the change in the items displayed on the first monitor. If the items displayed on the first monitor and the items displayed on the second monitor are not identical to each other, it is possible to execute processing for making the items displayed on the first monitor and the items displayed on the second monitor identical to each other.

In the following, a specific embodiment of the technology disclosed herein will be described with reference to the drawings. It should be understood that the dimensions, materials, shapes, relative arrangements, and other features of the components that will be described in connection with the embodiment are not intended to limit the technical scope of this disclosure only to them, unless otherwise stated.

First Embodiment

System Configuration

Figure 1:
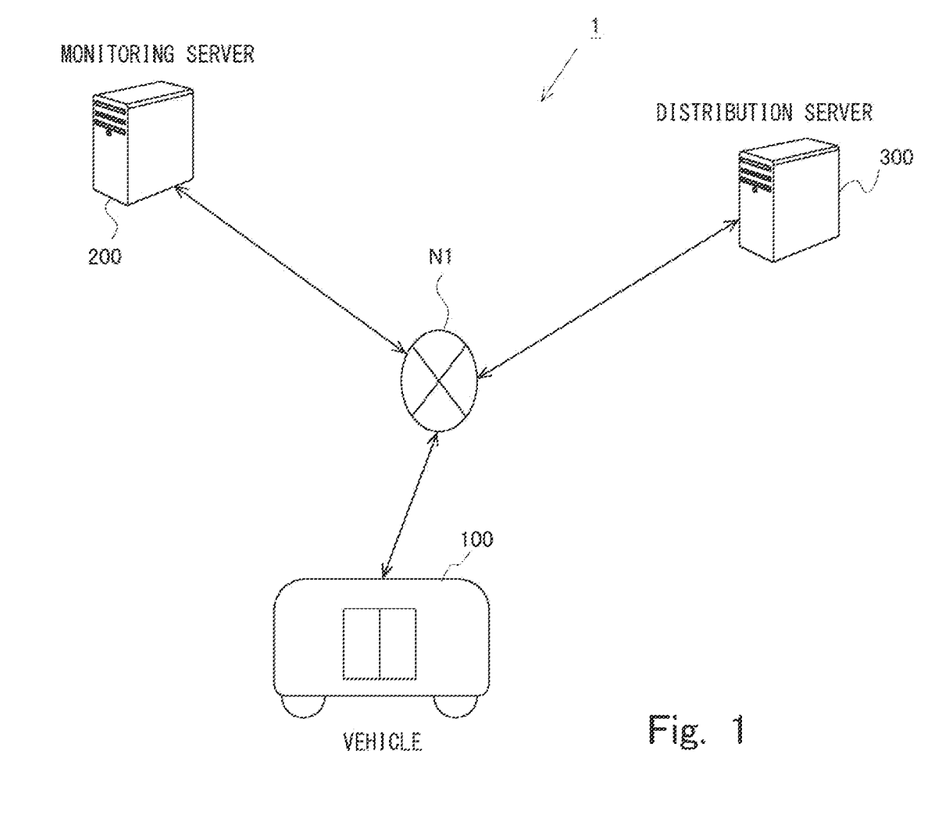
FIG. 1 is a diagram illustrating the general configuration of a vehicle management system.

FIG. 1 is a diagram illustrating the general configuration of a vehicle management system. The vehicle management system 1 is a system that manages a vehicle 100. The vehicle 100 is an autonomous vehicle, namely a vehicle capable of traveling autonomously according to a given operation plan. The operation of the vehicle 100 is monitored remotely by an observer. The vehicle management system 1 includes a monitoring server 200. The monitoring server 200 is a server used to remotely monitor the operation of the vehicle 100. The vehicle management system 1 also includes a distribution server 300. The distribution server 300 is a server that distributes or sends to the vehicle 100 various software for autonomous vehicles that is necessary for management of the travel or operation of the vehicle 100.

The vehicle 100, the monitoring server 200, and the distribution server 300 in the vehicle management system 1 are interconnected by a network N1. The network N1 may be a WAN (Wide Area Network), namely a global public communication network, such as the Internet, or a telephone communication network, such as a cellular phone communication network.

Figure 2:
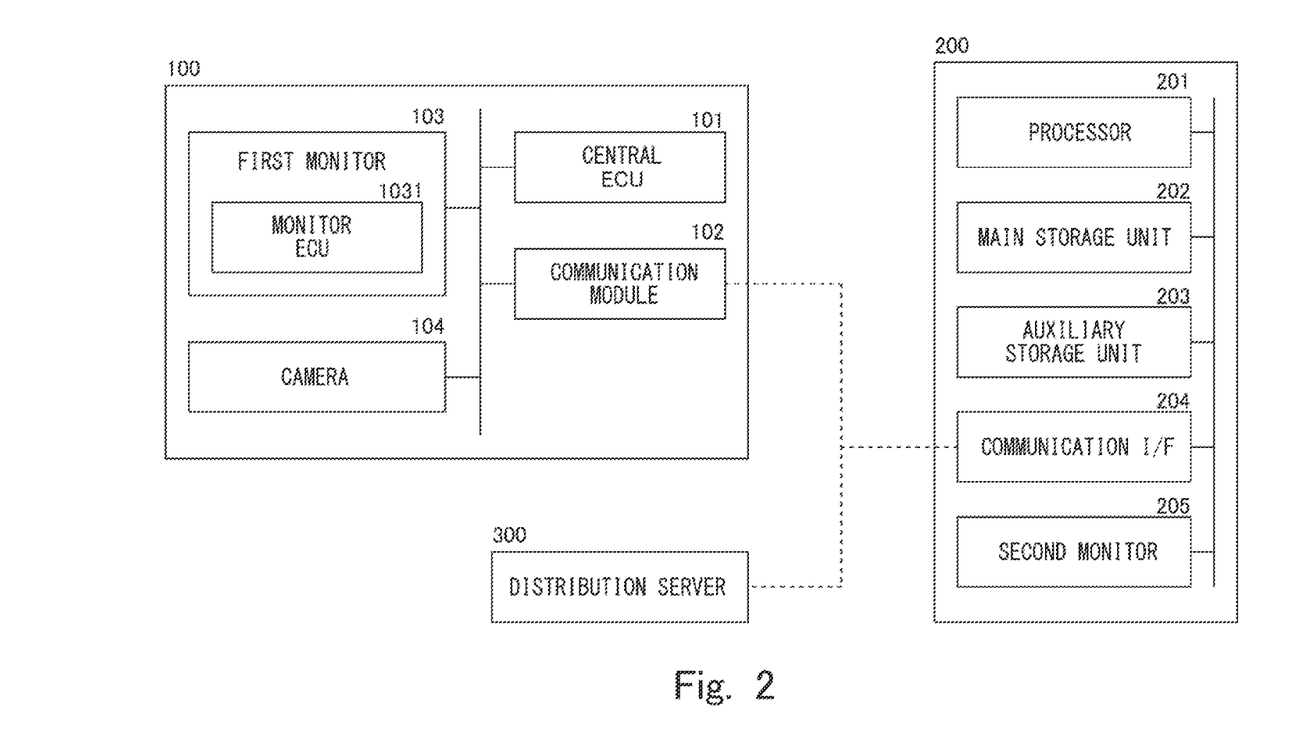
FIG. 2 is a block diagram illustrating the hardware configurations of a vehicle and a monitoring server.

FIG. 2 is a block diagram schematically illustrating the hardware configurations of the vehicle 100 and the monitoring server 200. The vehicle 100 has a central ECU (Electronic Control Unit) 101, a communication module 102, a first monitor 103, and a camera 104. The central ECU 101 is a computer that performs centralized control of ECUs that control various devices provided in the vehicle 100. The communication module 102 is a communication device used to connect the vehicle 100 to the network N1. The communication module 102 communicates with the monitoring server 200 and the distribution server 300 through the network N1 using a certain wireless communication standard, such as 3G (3rd Generation) or LTE (Long Term Evolution).

The first monitor 103 is a display device that displays the state of the vehicle 100 in the cabin of the vehicle 100. The items displayed on the first monitor 103 as the state of the vehicle 100 includes, for example, the speed of the vehicle 100, an indication of the state of lighting of the turn-signal lamps, an indication of the state of lighting of the headlights, various warnings (e.g. a warning as to the remaining battery capacity, a door ajar warning, and a brake warning), and various indications (e.g. an indication of the occurrence of tire slippage and an indication of operation of an anti-theft system). In the case where the travel mode of the vehicle 100 is switchable between the mode in which the vehicle 100 is driven by a human driver and the mode in which the vehicle 100 travels autonomously, the travel mode of the vehicle 100 may also be displayed on the first monitor 103 as the state of the vehicle 100. The display of the state of the vehicle 100 on the first monitor 103 enables a person in the cabin of the vehicle 100 (a person in the cabin who is in charge of supporting the operation of the vehicle 100) to know the state of the vehicle 100.

The first monitor 103 has a monitor ECU 1031. The monitor ECU 1031 is a computer that controls the first monitor 103. The monitor ECU 1031 controls the items displayed on the first monitor 103 by executing first software stored in a storage unit of the first monitor 103. Therefore, the items displayed on the first monitor 103 is determined by the first software.

The camera 104 takes images in the cabin of the vehicle 100. The camera 104 can capture an image of the screen displayed on the first monitor 103. The central ECU 101, the communication module 102, the first monitor 103, and the camera 104 in the vehicle 100 can communicate with each other using a certain in-vehicle communication standard. This in-vehicle communication standard may be, for example, CAN (Controller Area Network) or LIN (Local Interconnect Network).

The monitoring server 200 is a computer having a processor 201, a main storage unit 202, an auxiliary storage unit 203, a communication interface 204, and a second monitor 205. The processor 201 may be a CPU (Central Processing Unit) or a DSP (Digital Signal Processor). The main storage unit 202 may be a RAM (Random Access Memory). The auxiliary storage unit 203 may be a ROM (Read Only Memory), an HDD (Hard Disk Drive), or a flash memory. The auxiliary storage unit 203 may include a removable medium (or portable medium). Examples of the removable medium include a USB memory, an SD card, and a disc recording medium, such as a CD-ROM, a DVD disc, and a Blu-ray disc. What is stored in the auxiliary storage unit 203 includes an operating system (OS), various programs, and various information tables. The processor 201 loads programs stored in the auxiliary storage unit 203 into the main storage unit 202 and executes them to implement various controls for monitoring the operation of the vehicle 100.

The communication interface 204 connects the monitoring server 200 to the network N1. The communication interface 204 may be a LAN (Local Area Network) interface board or a wireless communication circuit for wireless communication.

The second monitor 205 is a display device used to remotely monitor the state of the vehicle 100. As with the first monitor 103 provided in the vehicle 100, the second monitor 205 also displays the state of the vehicle 100. Information about the state of the vehicle 100 is sent from the vehicle 100 to the monitoring server 200 through the network N1. The central ECU 101 of the vehicle 100 commands the communication module 102 to send information about the state of the vehicle 100 to the monitoring server 200. Information about the state of the vehicle 100 is sent from the vehicle 100 to the monitoring server 200 periodically at predetermined intervals. The second monitor 205 displays the state of the vehicle 100 based on the information received from the vehicle 100. The display of the state of the vehicle 100 on the second monitor 205 enables the observer to know the state of the vehicle 100. The processor 201 controls the items displayed on the second monitor 205 by executing second software. Therefore, the items displayed on the second monitor 205 is determined by the second software.

Some or all of the functions of the monitoring server 200 may be implemented by a hardware circuit, such as an ASIC or an FPGA. The monitoring server 200 is not necessarily required to be constructed as a single integrated component, but it may be constituted by a plurality of cooperating computers. The monitoring server 200 of this embodiment corresponds to the information processing apparatus according to the present disclosure.

Update of Software

As described above, the monitor ECU 1031 in the vehicle 100 executes the first software to control the items displayed on the first monitor 103. It may sometimes be necessary to update the first software stored in the storage unit of the first monitor 103. On such occasions, data for updating the first software is sent (or distributed) from the distribution server 300 to the vehicle 100. Such data will be also referred to as "first data" hereinafter. The communication module 102 of the vehicle 100 receives the first data sent from the distribution server 300. The central ECU 101 commands the monitor ECU 1031 to execute the processing of updating the first software using the first data.

The items displayed on the first monitor 103 may change with the update of the first software in some cases. To remotely monitor the state of the vehicle 100 through the second monitor 205 of the monitoring server 200, it is necessary that the items displayed on the second monitor 205 be identical with the items displayed on the first monitor 103. Hence, if the items displayed on the first monitor 103 changes, it is necessary that the items displayed on the second monitor 205 be also changed accordingly. Therefore, when the first software is updated in the vehicle 100, it is necessary for the second software, which controls the items displayed on the second monitor 205, to be updated in the monitoring server 200.

To this end, when the first software is updated, data for updating the second software is prepared beforehand. This data will also be referred to as "second data" hereinafter. The second data matches the first data so as to make the items displayed on the second monitor 205 after the update of the second software identical to the items displayed on the first monitor 103 after the update of the first software. The second data prepared beforehand is stored in the auxiliary storage unit 203 of the monitoring server 200. The processor 201 reads out the second data from the auxiliary storage unit 203 to update the second software. The procedures of updating the first software and the second software will be specifically described later.

Functional Configuration

Figure 3:
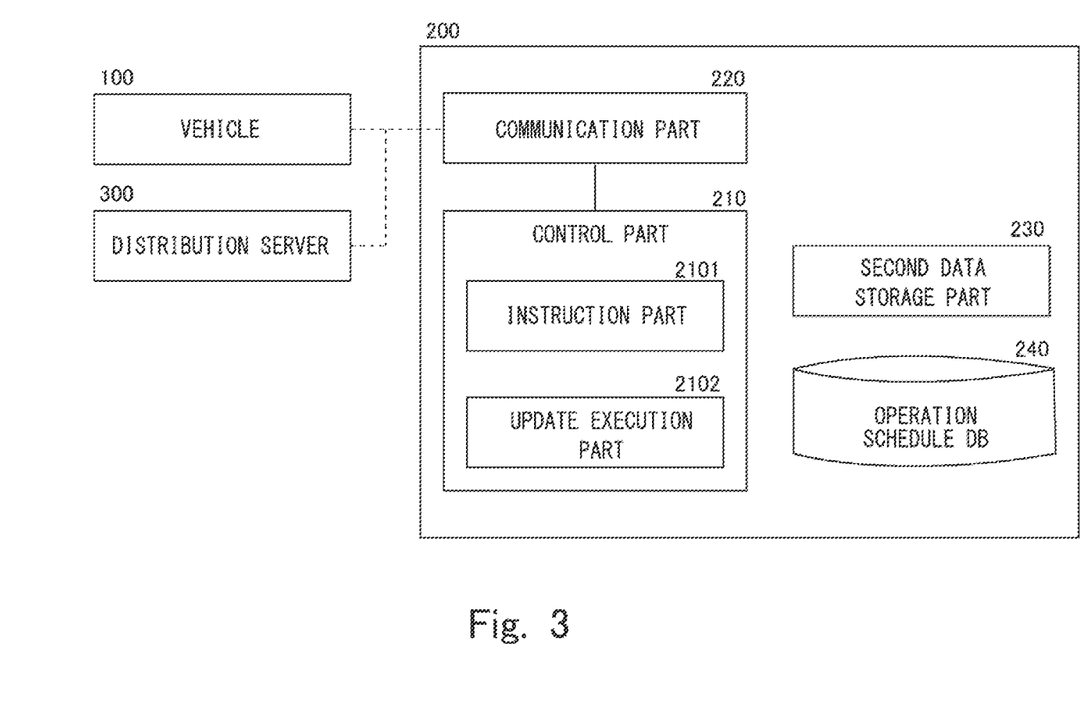
FIG. 3 is a block diagram illustrating an exemplary functional configuration of the monitoring server according to a first embodiment.

The functional configuration of the monitoring server 200 will now be described with reference to FIG. 3. FIG. 3 is a block diagram illustrating an exemplary functional configuration of the monitoring server 200.

The monitoring server 200 includes, as functional components, a control part 210, a communication part 220, a second data storage part 230, and an operation schedule database 240. The communication part 220 has the function of connecting the monitoring server 200 to the network. The communication part 220 can be implemented by the communication interface 204.

The control part 210 has the function of executing computation for controlling the monitoring server 200. The control part 210 can be implemented by the processor 201. The second data storage part 230 stores the second data prepared to update the second software. The operation schedule database 240 stores operation schedule of the vehicle 100. The operation schedule of the vehicle 100 includes a schedule during periods through which the vehicle 100 is out of operation. The second data storage part 230 and the operation schedule database 240 can be implemented by the auxiliary storage unit 203.

The control part 210 includes, as functional components, an instruction part 2101 and an update execution part 2102. The instruction part 2101 has the function of providing instructions designating the time at which the first software is to be updated to the vehicle 100. Specifically, when updating of the first software in the vehicle 100 is needed, the monitoring server 200 determines the time at which the first software is to be updated. Then, the monitoring server 200 provides instructions designating the time at which the first software is to be updated to the vehicle 100. By the time determined by the monitoring server 200 at which the first software is to be updated, the second data for updating the second software is prepared and stored in the second data storage part 230. The update execution part 2102 has the function of updating the second software using the second data. The processes executed by the instruction part 2101 and the update execution part 2102 will be specifically described below.

Instruction Process

Figure 4:
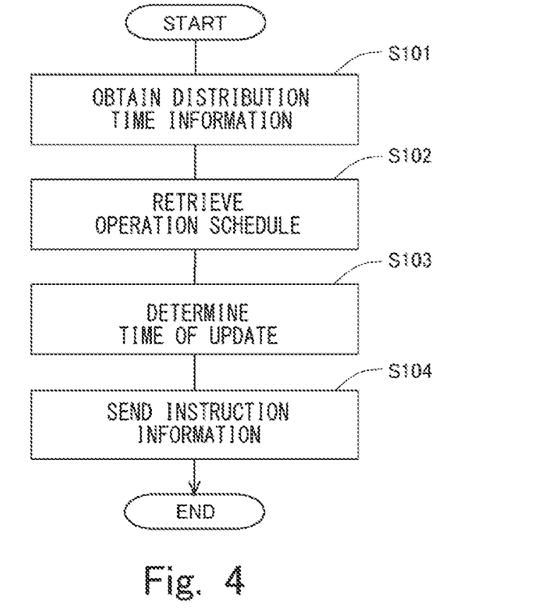
FIG. 4 is a flow chart of an instruction process.

An instruction process executed by the monitoring server 200 will now be described with reference to FIG. 4. The instruction process is executed to provide instructions designating the time at which the first software is to be updated to the vehicle 100. FIG. 4 is a flow chart of the instruction process. This process is executed by the instruction part 2101 of the control part 210.

As described above, in this vehicle management system 1, when the first software is to be updated in the vehicle 100, the distribution server 300 sends the first data to the vehicle 100. Before sending the first data to the vehicle 100, the distribution server 300 sends to the monitoring server 200 information about the time at which sending (or distribution) of the first data will become possible. This information will also be referred to as "distribution time information" hereinafter. The monitoring server 200 receives the distribution time information sent from the distribution server 300 through the communication part 220. When the monitoring server 200 receives the distribution time information from the distribution server 300, the instruction part 2101 executes the process according to the flow chart of FIG. 4.

In step S101 of the process according to the flow chart of FIG. 4, the distribution time information received through the communication part 220 is obtained. Then, in step S102, the operation schedule of the vehicle 100 stored in the operation schedule database 240 is retrieved.

Then, in step S103, the time at which the first software is to be updated is determined based on the distribution time information obtained in step S101 and the operation schedule retrieved in step S102. Specifically, selected as the time at which the first software is to be updated is the time at which the operation of the vehicle 100 is scheduled to be suspended after the time at which sending of the first data from the distribution server 300 will become possible. As the time at which the first software is to be updated is selected in this way, the first software can be updated during the vehicle 100 is not in operation.

Then, in step S104, instruction information that designates the time determined in step S103 at which the first software is to be updated is sent to the vehicle 100. The instruction information is sent from the communication part 220 to the vehicle 100. The vehicle 100 receives the instruction information sent to it through the communication module 102. Thus, the central ECU 101 of the vehicle 100 can recognize the time at which the first software is to be updated.

Updating Process

Figure 5:
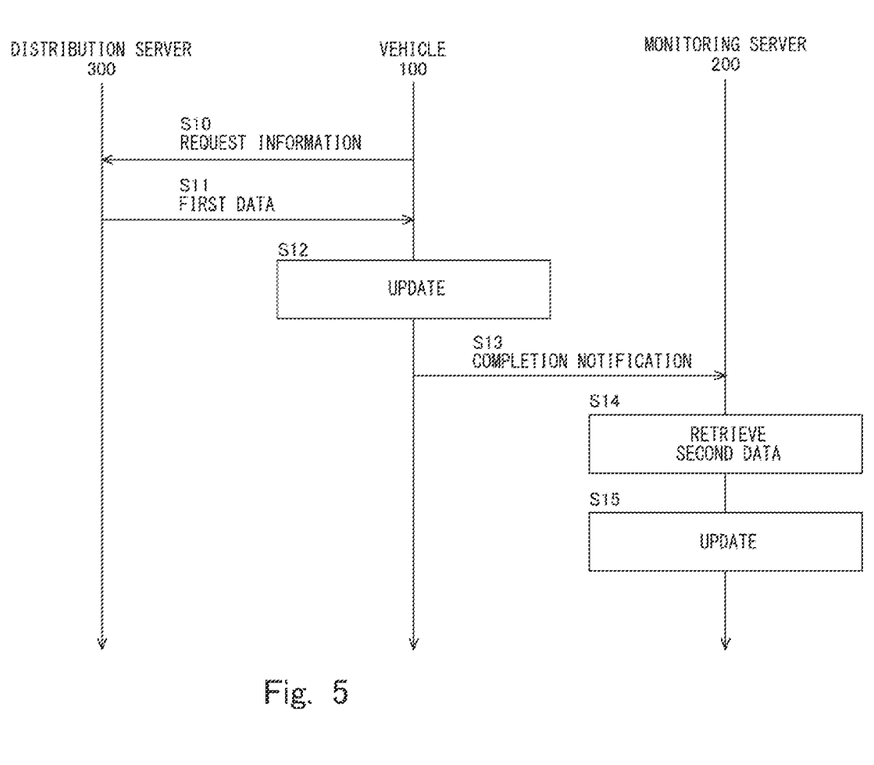
FIG. 5 is a sequence diagram illustrating the procedures of updating first software and second software.

Next, the process of updating the first software executed in the vehicle 100 and the process of updating the second software executed in the monitoring server 200 will be described with reference to FIG. 5. FIG. 5 is a sequence diagram illustrating the process of updating the first software and the process of updating the second software.

When the time at which the first software is to be updated, which is designated by the instruction information received from the monitoring server 200, comes, the vehicle 100 sends request information that requests sending of data for updating to the distribution server 300 (S10). Specifically, the central ECU 101 commands the communication module 102 to send this request information. When the distribution server 300 receives the request information from the vehicle 100, the distribution server 300 sends the first data to the vehicle 100 (S11). When the vehicle 100 receives the first data through the communication module 102, the central ECU 101 commands the monitor ECU 1031 to execute the processing of updating the first software using the first data. Thus, the first software stored in the storage unit of the first monitor 103 is updated (S12).

After the completion of updating of the first software in the vehicle 100, the vehicle 100 sends a completion notification to the monitoring server 200 (S13). The completion notification is information notifying that the updating of the first software has been completed. Specifically, the central ECU 101 commands the communication module 102 to send the completion notification.

The monitoring server 200 receives the completion notification sent from the vehicle 100 through the communication part 220. When the communication part 220 receives the completion notification, the update execution part 2102 of the control part 210 executes the processing of updating the second software. Specifically, the update execution part 2102 retrieves the second data stored in the second data storage part 230 (S14). Then, the update execution part 2102 executes the processing of updating the second software using the retrieved second data (S15). Thus, the second software is updated in the monitoring server 200.

In the above process, updating of the second software in the monitoring server 200 is triggered by the reception of the completion notification sent from the vehicle 100. Thus, it is possible to update the second software immediately following the update of the first software in the vehicle 100. In consequence, even if the items displayed on the first monitor 103 changes due to the update of the first software, it is possible to change the items displayed on the second monitor 205 in conformity with the change in the items displayed on the first monitor 103. Therefore, even if the first software is updated, the identity of the items displayed on the first monitor 103 and the items displayed on the second monitor 205 can be maintained.

When the first software and the second software are to be updated, another possible way of updating them is to update the second software first and then update the first software after the completion of updating of the second software in the order reverse to the above-described process according to the embodiment. However, the possibility of troubles occurring during the reception of data for updating the software or during the process of updating the software is higher in the vehicle 100 than in the monitoring server 200. Therefore, updating the second software after the completion of updating of the first software as in the above process according to the embodiment can achieve the identity of the items displayed on the first monitor 103 and the items displayed on the second monitor 205 more quickly.

Second Embodiment

A vehicle management system according to a second embodiment will be described next. The vehicle management system according to the second embodiment has the basically same configuration as the system according to the first embodiment, and similar components will be designated by similar reference signs. In the vehicle management system according to the second embodiment also, the first software and the second software are updated in a manner similar to that in the above-described system according to the first embodiment. In the system according to the second embodiment, a determination process is performed by the monitoring server 200 after the completion of updating of the first and second software. This determination process is the process of determining whether or not the items displayed on the first monitor 103 controlled by the first software after the update and the items displayed on the second monitor 205 controlled by the second software after the update are identical to each other. In the following description, features of the second embodiment that are different from or absent in the first embodiment will be described.

Functional Configuration

Figure 6:
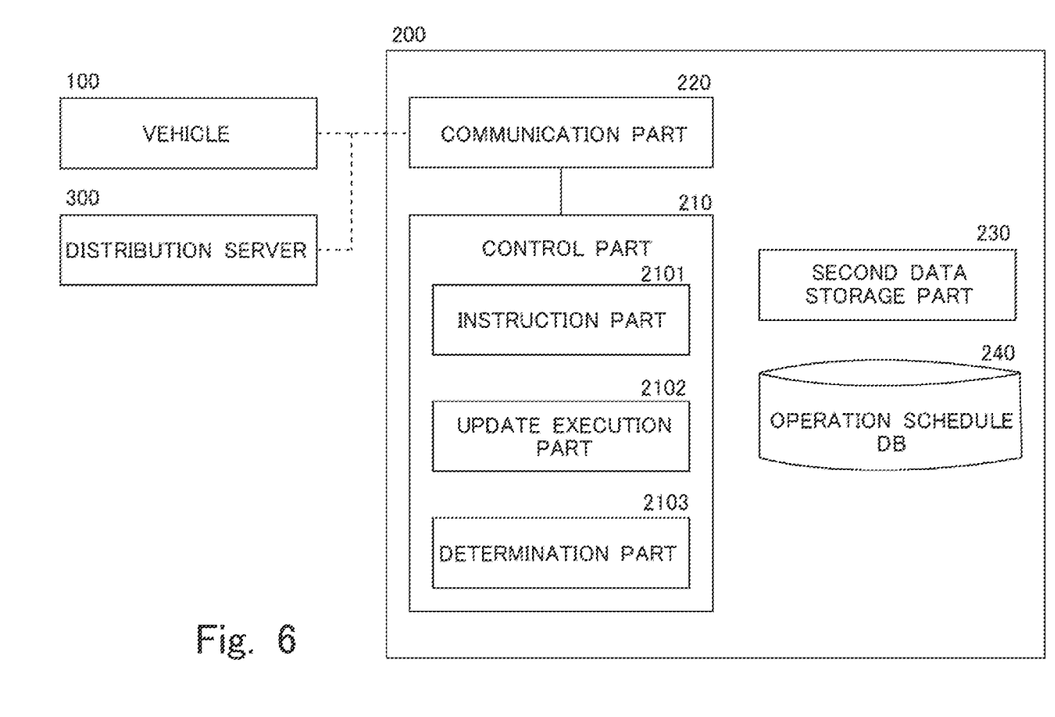
FIG. 6 is a block diagram illustrating an exemplary functional configuration of the monitoring server according to a second embodiment.

FIG. 6 is a block diagram illustrating an exemplary functional configuration of the monitoring server 200 in the system according to the second embodiment. As in the first embodiment, the monitoring server 200 in the second embodiment includes, as functional components, the control part 210, the communication part 220, the second data storage part 230, and the operation schedule database 240. The control part 210 in the second embodiment includes a determination part 2103 in addition to the instruction part 2101 and the update execution part 2102. The determination part 2103 has the function of executing the determination process.

The camera 104 provided in the vehicle 100 is capable of capturing an image of the image or screen displayed on the first monitor 103. The camera 104 in the vehicle 100 captures an image of the screen displayed on the first monitor 103 after the completion of updating of the first software. Thus, first image data representing the screen displayed on the first monitor 103 under the control of the first software after the update is created. In consequence, the first image data reflects the items displayed on the first monitor 103 controlled by the first software after the update.

The vehicle 100 sends the first image data created as above to the monitoring server 200. Specifically, the central ECU 101 commands the communication module 102 to send the first image data. The vehicle 100 may send the first image data to the monitoring server 200 together with the completion notification notifying the completion of updating of the first software.

The monitoring server 200 receives the first image data sent from the vehicle 100 through the communication part 220. Then, the monitoring server 200 executes the determination process using the first image data received from the vehicle 100.

Determination Process

Figure 7:
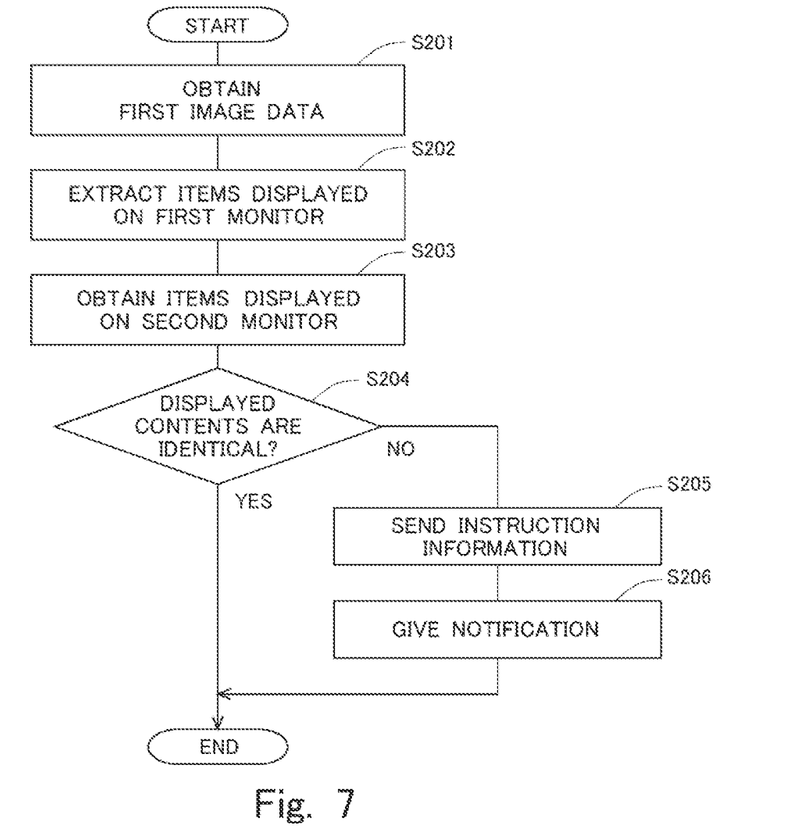
FIG. 7 is a flow chart of a determination process.

The determination process executed by the monitoring server 200 will be described with reference to FIG. 7. FIG. 7 is a flow chart of the determination process. This process is executed by the determination part 2103 in the control part 210.

In the process according to the flow chart of FIG. 7, the first image data received by the communication part 220 is obtained in step S201. Then, in step S202, the items displayed on the first monitor 103 is extracted from the first image data obtained in step S201. Specifically, image processing is performed on the first image data to extract the items displayed on the first monitor 103. Thus, the items displayed on the first monitor 103 controlled by the first software after the update is extracted.

Then, in step S203, the items displayed on the second monitor 205 controlled by the second software after the update is obtained. The items displayed on the second monitor 205 may be obtained based on the second data for updating the second software. Then, in step S204, it is determined whether or not the items displayed on the first monitor 103 and the items displayed on the second monitor 205 are identical to each other.

If the first data used for updating the first software and the second data used for updating the second software match each other, and updating of the first and second software has been completed satisfactorily in the vehicle 100 and the monitoring server 200, step S204 will be answered in the affirmative. If step S204 is answered in the affirmative, the determination process ends.

In contrast, if step S204 is answered in the negative, namely if it is determined that the items displayed on the first monitor 103 and the items displayed on the second monitor 205 are not identical, the processing of step S205 is executed next. In the case where step S204 is answered in the negative, there is a possibility that there is something wrong with the update of the first software in the vehicle 100. For example, there may be a case where the version of the first data for updating the first software sent from the distribution server 300 to the vehicle 100 is different from the proper version. There may also be a case where the update is completed with some trouble occurring in the process of updating the first software executed by the monitor ECU 103 remaining unsolved.

In step S205, instruction information instructing to check the updated subject matter in the first software is sent to the vehicle 100. The instruction information is sent from the communication part 220 to the vehicle 100. The vehicle 100 receives the instruction information sent as above through the communication module 102. When the vehicle 100 receives the instruction information, the central ECU 101 commands the monitor ECU 1031 to execute a processing for checking the updated subject matter in the first software. If it is found that the update of the first software has some trouble, the vehicle 100 may inform the monitoring server 200 of this fact. Moreover, if it is found that the update of the first software has some trouble, the monitor ECU 1031 may execute the processing of updating the first software again. In the case where the processing of updating the first software is executed again, the processing of checking the updated subject matter in the first software is also executed again.

Then, in step S206, a notification is given to the observer who remotely monitors the operation of the vehicle 100 through the second monitor 205 to notify that the items displayed on the first monitor 103 and the items displayed on the second monitor 205 are not identical to each other. This notification to the observer may be displayed on the screen of the second monitor 205. Alternatively, this information may be given by sound or voice. This enables the observer to know that the items displayed on the first monitor 103 and the items displayed on the second monitor 205 are no longer identical to each other. This can invite the observer to take some measure to make the items displayed on the first monitor 103 and the items displayed on the second monitor 205 identical to each other.

Other Embodiments

The embodiments described above are merely examples, and the present disclosure may be changed and implemented as appropriate within the scope of the disclosure. Furthermore, processes and means described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An information processing apparatus comprising a controller including at least one processor, the controller being configured to execute the processing of:
    receiving first image data representing an image displayed on a first monitor provided in an autonomous vehicle after the completion of updating of first software that controls the display on the first monitor, together with a completion notification that indicates the completion of updating of first software in the autonomous vehicle;

updating, triggered by the reception of the completion notification, second software that controls the display on a second monitor used for remotely monitoring the operation of the autonomous vehicle;

extracting items displayed on the first monitor from the first image data;

obtaining items displayed on the second monitor after the completion of updating of second software based on data for updating the second software; and determining whether or not the items displayed on a second monitor after the completion of updating of second software and the items displayed on the first monitor extracted from the first image data are identical to each other.

2. The information processing apparatus according to claim 1, wherein the first monitor and the second monitor are monitors that display the state of the autonomous vehicle.

3. The information processing apparatus according to claim 1, wherein the controller receives the first image data from the autonomous vehicle.

4. The information processing apparatus according to claim 3, wherein the first image data is image data created by capturing an image of an image displayed on the first monitor by a camera provided in the autonomous vehicle.

5. The information processing apparatus according to claim 1, wherein if the controller determines that the items displayed on the second monitor and the items displayed on the first monitor are not identical to each other, the controller further executes the processing of sending instruction information instructing to check updated subject matter in the first software to the autonomous vehicle.

6. The information processing apparatus according to claim 1, wherein if the controller determines that the items displayed on the second monitor and the items displayed on the first monitor are not identical to each other, the controller further executes the processing of controlling the second monitor to output an audio a notification to an observer who remotely monitors the operation of the autonomous vehicle through the second monitor.

7. The information processing apparatus according to claim 1, wherein the controller obtains data for updating the second software corresponding to subject matter of the update of the first software from a storage unit and updates the second software using the obtained data.

8. An information processing method comprising:

receiving first image data representing an image displayed on a first monitor provided in an autonomous vehicle after the completion of updating of first software that controls the display on the first monitor, together with a completion notification that indicates the completion of updating of first software in the autonomous vehicle:

updating, triggered by the reception of the completion notification, second software that controls the display on a second monitor used for remotely monitoring the operation of the autonomous vehicle:

extracting items displayed on the first monitor from the first image data:

obtaining items displayed on the second monitor after the completion of updating of second software based on data for updating the second software; and determining whether or not the items displayed on a second monitor after the completion of updating of second software and the items displayed on the first monitor extracted from the first image data are identical to each other.

9. The information processing method according to claim 8, wherein the first monitor and the second monitor are monitors that display the state of the autonomous vehicle.

10. The information processing method according to claim 8, wherein the first image data is received from the autonomous vehicle.

11. The information processing method according to claim 10, wherein the first image data is image data created by capturing an image of an image displayed on the first monitor by a camera provided in the autonomous vehicle.

12. The information processing method according to claim 8, wherein the method further comprises, if it is determined that the items displayed on the second monitor and the items displayed on the first monitor are not identical to each other, sending instruction information instructing to check updated subject matter in the first software to the autonomous vehicle.

13. The information processing method according to claim 8, wherein the method further comprises, if it is determined that the items displayed on the second monitor and the items displayed on the first monitor are not identical to each other, giving a notification to an observer who remotely monitors the operation of the autonomous vehicle through the second monitor.

14. The information processing method according to claim 1, further comprising obtaining data for updating the second software corresponding to subject matter of the update of the first software from a storage unit to update the second software using the obtained data.

15. A system comprising:

a computer, mounted on an autonomous vehicle, configured to send first image data representing an image displayed on a first monitor provided in the autonomous vehicle after the completion of updating of first software that controls the display on the first monitor, together with a completion notification that indicates the completion of updating of first software in the autonomous vehicle; and an information processing apparatus provided with a controller including at least one processor, the controller being configured to execute the updating, triggered by the reception of the completion notification, second software that controls the display on a second monitor used for remotely monitoring the operation of the autonomous vehicle, wherein the controller, further executes extracting items displayed on the first monitor from the first image data:

obtaining items displayed on the second monitor after the completion of updating of second software based on data for updating the second software; and determining whether or not the items displayed on a second monitor after the completion of updating of second software and the items displayed on the first monitor extracted from the first image data received from the computer are identical to each other.

16. The system according to claim 15, wherein the first monitor and the second monitor are monitors that display the state of the autonomous vehicle.

17. The system according to claim 15, wherein if the controller in the information processing apparatus determines that the items displayed on the second monitor and the items displayed on the first monitor are not identical to each other, the controller further executes the processing of sending instruction information instructing to check updated subject matter in the first software to the autonomous vehicle.

18. The system according to claim 15, wherein if the controller in the information processing apparatus determines that the items displayed on the second monitor and the items displayed on the first monitor are not identical to each other, the controller further executes the processing of giving a notification to an observer who remotely monitors the operation of the autonomous vehicle through the second monitor of that fact.

\* \* \* \* \*